United States Patent [19]

Ichikawa et al.

[11] Patent Number: 4,830,992

[45] Date of Patent: May 16, 1989

[54] CARBON CONTAINING REFRACTORY

[75] Inventors: Kenji Ichikawa, Bizen; Noboru Tsukamoto; Hitoshi Iwado, both of Okayama; Eishi Iida, Bizen, all of Japan

[73] Assignee: Shinagawa Refractories Co., Ltd., Tokyo, Japan

[21] Appl. No.: 261,883

[22] Filed: Oct. 25, 1988

[30] Foreign Application Priority Data

Dec. 28, 1987 [JP] Japan ................... 62-330161

[51] Int. Cl.$^4$ ............ C04B 35/49; C04B 35/52; C04B 35/54

[52] U.S. Cl. .................................. 501/100

[58] Field of Search ........................... 501/100

[56] References Cited

U.S. PATENT DOCUMENTS 4,326,040  4/1982  Kaji et al. .................... 501/100
4,585,485  4/1986  Shikano et al. .............. 501/100

*Primary Examiner*—Mark L. Bell
*Attorney, Agent, or Firm*—Oblon, Fisher, Spivak, McClelland & Maier

[57] ABSTRACT

A carbon containing refractory comprising, by weight: 5 to 60% of AZT clinker mainly constituted by $ZrO_2$, $Al_2O_3$, $TiO_2$ and $SiO_2$; 3 to 40% of a carbon source; and the balance being at least one or two refractories selected from a group consisting of alumina, magnesia, zirconia, mullite, spinel, calcia, and fused quartz.

3 Claims, No Drawings

CARBON CONTAINING REFRACTORY

BACKGROUND OF THE INVENTION

This invention relates to a carbon containing refractory for use in a molten metal refining furnace, superior in resistance to thermal shock and corrosion, and durable during use under severe conditions.

Recently, carbon containing refractories are increasingly used as a refractory for a molten metal refining furnace in order to prevent permeation of molten metal and/or slag into the refractory body or to make the refractory body high-heat-conductive and low-expansible to improve the resistace to thermal shock. Generally, carbon containing refractories are formed as various combinations of carbon and refractory oxide aggregate, such as alumina-carbon, magnesia-carbon, zirconia-carbon, and so on, according to the conditions under which the refractory is used, including the type of furnace and the slag composition.

In more detail, if the proportion of carbon is increased in the refractory oxide aggregate-carbon composition, the heat conductivity becomes higher and the thermal expansion coefficient becomes smaller, thereby improving the resistance to thermal shock as well as the anti-slag-permeation properties. In this case, however, the resistance to corrosion becomes lower since the content of the high-corrosion-resistant oxide aggregate is relatively reduced. If, conversely, the proportion of oxide aggregate is increased, the resistance to corrosion is improved but the heat conductivity becomes lower and the thermal expansion coefficient becomes higher, since the proportion of carbon becomes relatively small, resulting in a reduction in the resistance to thermal shock as well as a deterioration in the anti-slag-permeation properties.

Under the present conditions, in the carbon containing refractory based on combinations of refractory oxide aggregate and carbon, the contents of respective components are restricted within suitable ranges according to the conditions under which the refractory is used, in order to balance the resistance to thermal shock, the anti-slag-permeation properties and the anti-corrosion properties with each other.

SUMMARY OF THE INVENTION

It is therefor an object of the present invention to provide a carbon containing refractory having improved and optimized anti-corrosion and wear resistance properties without reducing the resistance to thermal shock and the anti-slag-permeation properties.

To this end, the present invention provides a carbon containing refractory comprising, by weight:

(a) 5 to 60% of AZT clinker having 10 to 60% of $ZrO_2$, 20 to 90% of $Al_2O_3$, 3 to 40% of $TiO_2$, and 0.5 to 30% of $SiO_2$, the sum of the contents of $TiO_2$ and $SiO_2$ being smaller than 40%;

(b) 3 to 40% of a carbon source;

(c) and the balance being at least one or two refractories selected from a group consisting of alumina, magnesia, zirconia, mullite, spinel, carcia, and fused quartz.

DESCRIPTION OF THE PREFERRED EMBODIMENTS

AZT clinkers which pertain to the present invention are clinkers containing alumina, zirconia, titania and silica as main components and which are ordinarily formed in such a manner that raw-material powders are mixed to form respective compositions and are fused in an electric furnace so as to form clinker or that a composition mixture is formed as pellets and is, after being dried, burned at a temperature equal to or higher than 1500° C. to form clinker.

While, in the material composition of AZT clinker, besides corundum, baddeleyite and mullite as main mineral phases, aluminum titanate which is low-expansible is formed as part of the corundum, and tetragonal or cubic stabilized zirconia phase is formed as part of non-stabilized monoclinic zirconia (Baddeleyite), since $TiO_2$ is added. The AZT clinker comprises at least three of these types of mineral phases and exhibits a composition in which constituents coexist while being uniformly distributed.

As is well known, mullite has a small thermal expansion coefficient, and aluminum titanate has a thermal expansion coefficient smaller than that of mullite. Baddeleyite exhibits a change in the volume (contraction) in response to crystal phase transformation from the monoclinic system to the tetragonal system, which is also a well-known fact. Therefore the AZT clinker which contains aluminum titanate and stabilized zirconia and which is constituted by at least three types of crystal phases of the above substances has a thermal expansion coefficient much smaller than those of corundum and baddeleyite. It is therefore possible to effectively reduce the thermal expansion and improve the resistance to thermal shock without increasing the carbon content, by adding this clinker to the materials to form a carbon containing refractory.

In addition, in the carbon containing refractory containing AZT clinkers, fine microcracks are formed around particles and matrices of the AZT clinkers during heating because of difference between extents of thermal expansion of crystal phases coexisting in the AZT clinker particles (mismatch). This is effective in terms of reduction in the elastic modulus of the carbon containing refractory and, hence, reduction in thermal stress caused at the time of quick heating. In this respect also, the addition of AZT clinkers also contributes to improvement in the resistance to thermal shock.

The basis on which the chemical composition of the AZT clinker is limited will be described below. If the content of $ZrO_2$ is less than 10% by weight, the effect of the volume change in response to the phase transformation of baddeleyite is inadequate. If the content of $ZrO_2$ exceeds 60% by weight, the volume change in response to the phase transformation becomes excessively large, which causes collapse of particles and makes the refractory unusable in fact. If the content of $Al_2O_3$ is less than 20% by weight, specific high anti-corrosion properties of alumina are not exhibited. If this content exceeds 90% by weight, the majority of the main mineral phases are changed into corundum, and the effects of the other mineral phases become inadequate. If $TiO_2$ is less than 3 % by weight, stabilized zirconia and aluminum titanate having thermal expansion coefficients smaller than those of the other component minerals are not sufficiently produced. If, conversely, the content of $TiO_2$ exceeds 40% by weight, the melting point of the resulting clinker becomes markedly reduced, which is not preferable in terms of resistance to corrosion. With respect to the $TiO_2$ content, an example of the composition of alumina-zirconia raw-material containing 2 % of $TiO_2$ has been reported [Refractory, 39 No. 9, pp 513 to 514 (1987)]. In the case where the $TiO_2$ content is less than 3 %, an increase in the tenacity is recognized but the effect of improvement in the resistance to thermal shock is inadequate. In the Japanese Patent Laid-Open No. 60-96567, a sliding nozzle plate comprising $Al_2O_3$-$ZrO.TiO$ clinker and other materials has been disclosed. However, since this clinker is different from the clinker of the present invention and containing almost no $SiO_2$ in it, the growth of mullite is little and the effects to lower the thermal expansion is also small, so the sharp improvement in thermal spalling can not be expected. If the $SiO_2$ content is less than 0.5 %, mullite phase having small thermal expansion coefficient is not formed sufficiently, which is not preferable. If the $SiO_2$ content is increased, the melting point of the clinker becomes lower, and mineral phases of aluminum titanate and zirconia become reduced, which is not preferable. The effects of the present invention, however, are not lost so long as the sum of the contents of $SiO_2$ and $TiO_2$ is less than 40%.

If the proportion of AZT clinkers in the composition is less than 5 % by weight, the above-described advantages of AZT clinkers are not sufficiently utilize. In terms of resistance to corrosion, it is not preferable to set the proportion of AZT clinkers above 60% by weight.

A carbon raw-material has a heat conductivity markedly higher than that of the refractory oxide aggregate and, specifically, it is not easily wetted with molten metal and slag. In accordance with the present invention, therefore, carbon sources are added to an extent such that the anticorrosion properties are sufficiently maintained, thereby preventing molten metal and/or slag permeating into pores of the carbon containing refractory as well as improving the resistance to thermal shock. Natural flaky graphite is preferable as a carbon source. It is possible to use other carbon sources as desired, including amorphous graphite, man-made graphite, coke, carbon black, electrode refuse, and so on. Other refractory aggregates, at least one or two types, may be selected from alumina, magnesia, zirconia, mullite, spinel, calcia, and fused quartz according to the conditions under which the refractory is used.

It is possible to add other materials such as silicon carbide, boron carbide, metallic aluminum, metallic silicon, ferrosilicon, and so on, in order to improve the strength and anti-oxidation properties of the refractory.

Embodiments of the present invention will be described below.

Electro-fused AZT clinkers (AZT-1 to 8) having chemical compositions and mineral compositions shown in Table 1 were used to prepare compounds Nos. 1 to 10 (weight percent) shown in Table 2. Of these compounds, the compounds Nos. 1 to 4 are alumina-graphite compounds, the compounds Nos. 5 to 7 are magnesia-graphite compounds, and the compounds Nos. 8 to 10 are zirconia-graphite compounds. A predetermined amount of phenol resin was added to each compound, and the compounds underwent mixing and kneading. Thereafter, the compounds Nos. 1 to 7 were press-formed at 1 ton/cm$^2$ with a uniaxial compression press while the compounds Nos. 8 to 10 were press-formed at 1.5 ton/cm$^2$ with a rubber press. The compacts underwent coking by being burned at 1000° C. in a non-oxidizing atmosphere of coke breeze.

Table 2 shows comparison between general characteristics, anti-corrosion properties and thermal shock resistance properties of burnt bodies thereby obtained.

TABLE 1

| Raw material symbols | | AZT-1 | AZT-2 | AZT-3 | AZT-4 | AZT-5 | AZT-6 | AZT-7 | AZT-8 |
|---|---|---|---|---|---|---|---|---|---|
| Chemical composition (% by weight) | $Al_2O_3$ | 80 | 69 | 50 | 68 | 66 | 24 | 62 | 59 |
| | $ZrO_2$ | 15 | 25 | 28 | 20 | 20 | 60 | 20 | 20 |
| | $TiO_2$ | 3 | 5 | 7 | 10 | 12 | 15 | 17 | 20 |
| | $SiO_2$ | 2 | 1 | 15 | 2 | 2 | 1 | 1 | 1 |
| Mineral composition | | corundum, zirconia (M), aluminum titanate zirconia (C), mullite | corundum, zirconia (M), aluminum titanate, zirconia (C), mullite | zirconia (M), mullite, zirconia (C), corumdum, aluminum titanate | corundum, zirconia (M), aluminum titanate, zirconia (C), mullite | corundum, zirconia (M), aluminum titanate, zirconia (C), mullite | zirconia (C), aluminum titanate zirconia (M), corundum, mullite | corundum, zirconia (M), aluminum titanate, zirconia (C), mullite | same as left |

TABLE 2

| | Alumina-graphite | | | | Magnesia-graphite | | | Zirconia-graphite | | |
|---|---|---|---|---|---|---|---|---|---|---|
| | Reference Example | Examples of the present invention | | | Reference Example | Examples of the present invention | | Reference Example | Examples of the present invention | |
| | No. 1 | No. 2 | No. 3 | No. 4 | No. 5 | No. 6 | No. 7 | No. 8 | No. 9 | No. 10 |
| Composition (% by weight) | | | | | | | | | | |
| AZT-2 | | 10 | | | | | | | | |
| AZT-8 | | 10 | 10 | 5 | | | | | | 5 |
| AZT-3 | | | 10 | | | | 5 | | | |
| AZT-1 | | | | 5 | | | | | | |
| AZT-6 | | | | | | 5 | 10 | | 5 | 5 |
| Electro-fused alumina | 77 | 60 | 60 | 70 | | | | | | |
| Electro-fused magnesia | | | | | 77 | 70 | 67 | | | |
| Stabilized zirconia | | | | | | | | 77 | 75 | 73 |
| Silicon carbide | 5 | 5 | 5 | 5 | | | | 5 | 5 | 5 |
| Flaky graphite | 12 | 9 | 9 | 9 | 20 | 18 | 15 | 18 | 15 | 12 |
| Metallic aluminum | 3 | 3 | 3 | 3 | 3 | 3 | 3 | | | |
| Metallic silicon | 3 | 3 | 3 | 3 | | | | | | |
| Characteristics | | | | | | | | | | |
| Apparent pore proportion (%) | 10.0 | 9.7 | 10.0 | 9.5 | 11.5 | 11.0 | 12.0 | 15.0 | 15.5 | |
| Bulk density | 3.10 | 3.22 | 3.18 | 3.20 | 2.78 | 2.85 | 2.92 | 3.35 | 3.35 | 3.32 |

TABLE 2-continued

|  | Alumina-graphite | | | | Magnesia-graphite | | | Zirconia-graphite | | |
|---|---|---|---|---|---|---|---|---|---|---|
|  | Reference Example | Examples of the present invention | | | Reference Example | Examples of the present invention | | Reference Example | Examples of the present invention | |
|  | No. 1 | No. 2 | No. 3 | No. 4 | No. 5 | No. 6 | No. 7 | No. 8 | No. 9 | No. 10 |
| Bending strength (kg/cm$^2$) | 150 | 160 | 150 | 155 | 110 | 110 | 105 | 90 | 95 | 85 |
| Compressive strength (kg/cm$^2$) | 600 | 650 | 600 | 630 | 280 | 260 | 250 | 320 | 350 | 300 |
| Elastic modulus (kg/mm$^2$) | 5500 | 4900 | 4500 | 5200 | 1000 | 950 | 840 | 1100 | 950 | 850 |
| Thermal expansion coefficient (%, 1000° C.) | 0.57 | 0.53 | 0.51 | 0.55 | 0.91 | 0.88 | 0.86 | 0.46 | 0.43 | 0.41 |
| Corrosion resistance index*[1] | 100 | 85 | 93 | 80 | 100 | 90 | 95 | 100 | 85 | 95 |
| Thermal shock resistance*[2] | C | A | A | B | C | B | A | C | B | A |

*[1]Corrosion resistance index
Nos. 1 to 4: Extents of corrosion after corrision test with high frequency induction furnace using pig iron and torpedo car slag are reduced to index numbers with the reference example indicated by 100.
Nos. 5 to 7: Extents of corrosion after corrosion test with high frequency induction furnace using steel and ladle slag are reduced to index numbers with the reference example indicated by 100.
Nos. 8 to 10: Extents of corrosion after corrosion test with high frequency induction furnace using steel and continuous casting mold slag are reduced to index numbers with the reference example indicated by 100.
*[2]States of cracks were observed with the eye after 5 times repetition of heating at 1500° C. for 10 min. and cooling with water.
A: superior,
B: good,
C: ordinary As is apparent from Table 2, the articles of the present invention, that is, all of alumina-graphite, magnesia-graphite and zirconia-graphite refractories have smaller thermal expansion coefficients and smaller elastic moduli, and are improved in the resistance to thermal shock while they have smaller carbon contents and have improved anti-corrosion properties when compared with reference examples.

An example of application of the carbon containing refractories in accordance with the present invention to a molten steel continuous casting nozzle will be described below. Compounds shown in Table 3 (weight percent) were prepared by using the AZT raw-materials shown in Table 1. A predetermined amount of phenol resin was added to each compound, and the compounds underwent mixing, kneading, and pelletization. Thereafter, the compounds were formed by a hydrostatic press into a long nozzle shape. The compacts underwent coking by being burned at 1000° C. in a non-oxidizing atmosphere of coke breeze. Table 3 shows comparison between general qualities, anti-corrosion properties and thermal shock resistance properties of burnt bodies thereby obtained.

TABLE 3

|  | Comparison example 1 | Example 1 | Example 2 | Exmaple 3 | Example 4 |
|---|---|---|---|---|---|
| Composition (% by weight) | | | | | |
| AZT-2 | — | 5 | 5 | 10 | 10 |
| AZT-4 | — | — | 5 | — | 10 |
| AZT-5 | — | — | — | 10 | 5 |
| AZT-7 | — | — | — | — | 5 |
| Electro-fused alumina | 48 | 43 | 43 | 38 | 35 |
| Fused quartz | 25 | 25 | 20 | 15 | 10 |
| Flaky graphite | 27 | 27 | 27 | 27 | 25 |
| Characteristics | | | | | |
| Apparent pore proportion (%) | 15.0 | 15.0 | 15.0 | 15.0 | 15.5 |
| Bulk density | 2.35 | 2.38 | 2.40 | 2.45 | 2.50 |
| Elastic modulus (kg/mm$^2$) | 1,100 | 1,000 | 950 | 850 | 800 |
| Bending strength (kg/cm$^2$) | 95 | 100 | 100 | 95 | 95 |
| Thermal expansion coefficient (%, 1000° C.) | 0.33 | 0.30 | 0.30 | 0.28 | 0.28 |
| Corrosion resistance index*[1] | 100 | 95 | 90 | 80 | 85 |
| Thermal shock resistance index*[2] | C | B | B | A | A |

*[1]Extents of corrosion after molten steel corrosion test with a high frequency induction furnace (1600° C./5 hrs) are reduced into index numbers with reference example 1 indicated by 100.
*[2]States of cracks were observed with the eye after 5 times repetition of immersion in molten steel for 10 min. and cooling with water.
A: superior,
B: good,
C: ordinary As is apparent from table 3, the articles of the present invention are low-expandable and improved in the resistance to thermal shock as well as the resistance to corrosion when compared with the reference example 1. In a steel mill A where the same member as the reference example 1 was used as a molten steel continuous casting long nozzle, long nozzles in accordance with examples 2 and 3 of the present invention were used under the non-preheating condition. As a result, in the case of the conventional long nozzle in accordance with the reference example 1 used under the non-preheating condition, cracks take place due to thermal shock at a rate of 2 to 3%, and the number of average times of use was 5 to 6 charges. In contrast, in the case of the long nozzles in accordance with the examples 2 and 3 of the present invention, there were no crack defects due to thermal shock while the numbers of average times of use were 7 to 8 charges and 9 to 10 charges, respectively, thus, greatly improving the durability.

Another example of application of the carbon containing refractories of the present invention to a molten steel casting sliding nozzle (hereinafter referred as SN) refractory will be described below. Compounds shown in Table 4 were prepared by using the AZT raw-materials shown in Table 1. A predetermined amount of phenol resin was added to each compound, and the compounds underwent mixing, and kneading. Thereafter, the compounds were formed by a uniaxial compression press into SN plate bricks and upper and lower SN bricks. The plate bricks thereby obtained were burned at 1400° C. in a non-oxidizing atmosphere of coke breeze while the upper and lower nozzle bricks underwent baking at 300° C. Table 4 shows comparison between general qualities, anti-corrosion properties and thermal shock resistance properties of the obtained bricks.

the average. Also, cracks were remarkably reduced compared with the reference example.

In a steel mill C where bricks in accordance with the reference examples 2 and 5 were used as continuous casting tundish SN plate bricks and a lower nozzle, bricks in accordance with the examples 4 and 7 of the present invention were used as plate bricks and lower nozzles. As a result, in the plate bricks in accordance with the reference example 2, there were many and deep cracks due to thermal shock, and the number of time of use was only one (1 tundish). In contrast, in the plate bricks in accordance with the example 4 of the present invention, cracks due to thermal shock were small, and it was possible to use these bricks two times (two tundish). With respect to the lower nozzle, the material in accordance with the reference example 6 sometimes caused air infiltration trouble by cracks due

TABLE 4

|  | SN plate bricks | | | | Upper and lower SN bricks | | |
| --- | --- | --- | --- | --- | --- | --- | --- |
|  | Comp. example 1 | Comp. example 2 | Example 3 | Example 4 | Comp. example 5 | Example 6 | Example 7 |
| Composition (% by weight) | | | | | | | |
| AZT-2 | — | — | 5 | 10 | — | 10 | 10 |
| AZT-4 | — | — | — | — | — | — | 5 |
| AZT-6 | — | — | — | 5 | — | — | — |
| Mullite | — | 20 | — | — | 20 | 10 | — |
| Alumina | 92 | 70 | 82 | 75 | 73 | 73 | 78 |
| Clay | — | 3 | — | 3 | 3 | 3 | 3 |
| Flaky graphite | 3 | 3 | 3 | 3 | 3 | 3 | 3 |
| Cokes | 5 | 3 | 5 | 3 | — | — | — |
| Carbon black | — | 1 | — | 1 | 1 | 1 | 1 |
| Metallic silicon | ext. 2 | ext. 2 | ext. 2 | ext. 2 | ext. 2 | ext. 2 | ext. 2 |
| Metallic aluminum | ext. 1 | ext. 1 | ext. 1 | ext. 1 | ext. 3 | ext. 3 | ext. 3 |
| Characteristics | | | | | | | |
| Apparent pore proportion (%) | 10.0 | 9.5 | 10.5 | 10.0 | 6.0 | 6.2 | 6.5 |
| Bulk density | 3.07 | 2.98 | 3.10 | 3.08 | 3.01 | 3.05 | 3.07 |
| Compressive strength (kg/cm$^2$) | 1850 | 1730 | 1780 | 1750 | 900 | 920 | 850 |
| Elastic modulus (kg/mm$^2$) | 4400 | 4000 | 3600 | 3200 | 2800 | 2500 | 2300 |
| Thermal expansion coefficient (%, 1500° C.) | 1.20 | 1.02 | 0.95 | 0.90 | 1.05 | 0.98 | 0.94 |
| Corrosion resistance index*[1] | 90 | 100 | 85 | 90 | 100 | 90 | 85 |
| Thermal shock resistance index*[2] | C | B | A | A | C | B | A |

*[1]Extents of corrosion after molten steel corrosion test with a high frequency induction furnace (1600° C./5 hrs) are reduced into index numbers with reference example 1 indicated by 100.
*[2]States of cracks were observed with the eye after 5 times repetition of immersion in molten steel for 10 min. and cooling with water.
A: superior,
B: good,
C: ordinary As is apparent from Table 4, the articles of the present invention, namely both the plate bricks and upper and lower nozzle bricks are superior in the resistance to thermal shock compared with the reference examples and have anti-corrosion properties equal to or superior than those of the reference examples. In a steel mill B where bricks in accordance with the reference examples 1 and 5 were used as a ladle, SN plate bricks, and an upper nozzle, bricks in accordance with the examples 3 and 6 of the present invention were used as plate bricks and upper nozzles. As a result, in the case of the plate bricks in accordance with the reference example 1, the numbr of average times of use was limited to about 4 charges because of considerable edge breakages due to thermal shock. In contrast, in the case of the plate bricks in accordance with the example 3 of the present invention, there were reduced edge breakages, and the number of average times of use was 6 charges. With respect to the upper nozzle, while the number of average times of use of the conventional bricks in accordance with the reference example 5 was limited to 8 charges because of enlargement of the nozzle bore, the upper nozzles in accordance with the example 6 were used 12 times on to thermal shock. The lower nozzles 7 in accordance with the example 7 of the present invention were free from this kind of trouble and were greatly improved in terms of prevention of enlargement of the nozzle bore compared with the conventional nozzle. As described above, the carbon containing refractory formed by adding AZT clinkers to the raw-material is apparently advantageous.

The carbon containing refractory containing AZT clinkers in accordance with the present invention is effectively improved in the thermal shock resistance properties without impairing anti-corrosion properties.

What is claimed is:

1. A carbon containing refractory essentially consisting, by weight:
    (a) 5 to 60% of AZT clinker having 10 to 60% of $ZrO_2$, 20 to 90% of $Al_2O_3$3 to 40% of $TiO_2$, and 0.5 to 30% of $SiO_2$, the sum of the contents of $TiO_2$ and $SiO_2$ being smaller than 40%;
    (b) 3 to 40% of a carbon source;
    (c) and the balance being at least one refractory selected from a group consisting of alumina, magnesia, zirconia, mullite, spinel, calcia, and fused quartz.

2. A carbon containing refractory according to claim 1, wherein said carbon source includes at least one substance selected from the group consisting of flaky graphite, amorphous graphite, man-made graphite, coke, carbon black, and electrode refuse.

3. A carbon containing refractory according to either claim 1 or 2, wherein, in said AZT clinker, the content of $Al_2O_3$ is 40 to 70% by weight, the content of $ZrO_2$ is 25 to 40% by weight, the content of $TiO_2$ is 3 to 15 % by weight, and the content of $SiO_2$ is 1 to 20% by weight.

* * * * *